MULTIPARTY RINGING SELECTION CIRCUIT
Filed March 25, 1965
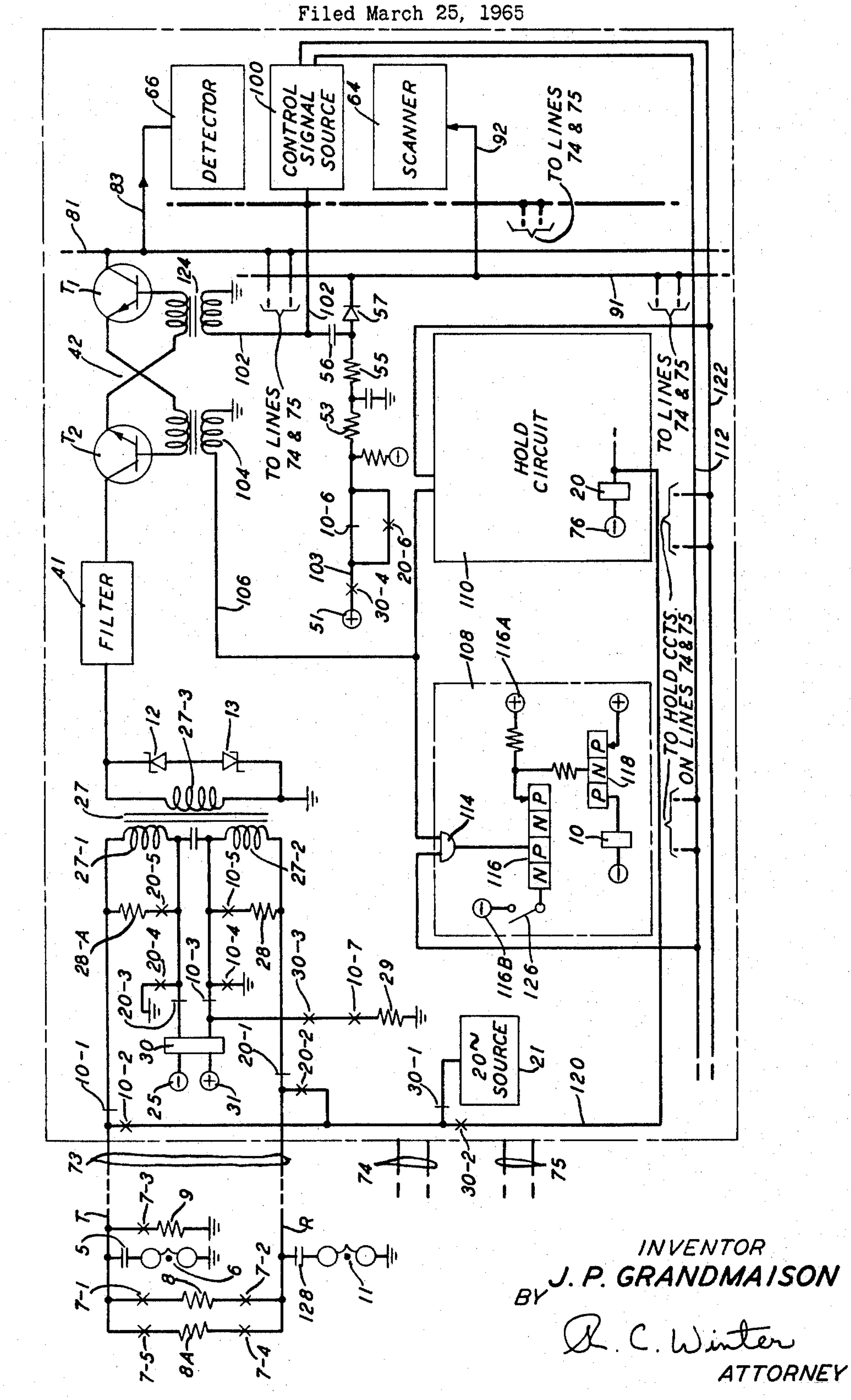
INVENTOR
J. P. GRANDMAISON
BY R. C. Winter
ATTORNEY

United States Patent Office 3,391,253
Patented July 2, 1968

3,391,253
MULTIPARTY RINGING SELECTION CIRCUIT

John P. Grandmaison, Matawan, N.J., assignor to Bell Telephone Laboratories, Incorporated, New York, N.Y., a corporation of New York
Filed Mar. 25, 1965, Ser. No. 442,607
15 Claims. (Cl. 179—84)

This invention relates to time division communication systems and, more particularly, to a method and apparatus for applying ringing tone and the like to specific stations on multistation lines in such systems.

Generally, because of low cost, a continuing demand exists for multistation or "party line" telephone service. The technical sophistication of modern time division telephone systems, however, has established an environment for multistation line operation which has engendered new technical problems. Consequently, multistation line service can be provided in this new environment at an acceptable cost only by developing reliable and inexpensive techniques which overcome these unique problems.

The transmission of ringing current through a time division network to one of the stations sharing a multistation line is typical of the problems characterizing this new relation, because conventional ringing current is too powerful to be transmitted directly through the time division system to the called station. This apparent incompatibility must be resolved by providing some means for remotely or indirectly applying ringing current to a particular station on a multistation line.

A typical common control communication system employing time division principles confronted with this ringing current problem is described in the E. L. Seley et al. patent application Ser. No. 252,797, filed Jan. 21, 1963, now Patent No. 3,268,669, issued Aug. 23, 1966, which provides for a plurality of terminal stations connected to a common transmission bus through corresponding line gates. These gates are sampled on a selective basis for a predetermined time interval in a recurrent cycle of time intervals. If a pair of gates is closed simultaneously for the prescribed time interval, a sample of the information available at each closed gate will be transferred through the opposite closed gate via the common transmission bus and low pass filters included in the line circuits corresponding to the active gates.

In this manner, a bilateral connection is established which, although physically connected only a small fraction of the time, appears to be continuously connected because of the smoothing action of the line filters.

This connection thus established enables any party on the multiparty line to obtain a communication connection through the system. This connection does not, however, provide any indication, of itself, as to the particular party involved nor can it, by itself, provide the necessary information for selection between the parties for selective ringing of one of the multiparties on the line.

It is a general object of this invention to provide a means for performing logical functions at a specific station sharing a multistation line.

It is another object of this invention to provide a method and apparatus for selectively ringing individual stations on a multistation line.

It is another object of this invention to provide a more economical means for selectively ringing a specific station coupled to a multistation line in a time division telephone system.

It is still another object of this invention to provide, in an array of multistation lines, means individual to one of the lines and means common to several of the lines but associated with only one station on each of the lines for applying ringing tone to a selected station.

These and other objects of the invention are attained in one specific illustrative embodiment in the environment of the common control telephone system employing time division switching described in the E. L. Seley et al. patent application hereinbefore mentioned. An appreciation of the common control and time division features of this telephone system will be useful to understand more completely the specific method and apparatus for applying ringing tone to a selected station sharing a multistation line, to be described hereinafter.

Accordingly, the common control telephone system using time division principles relies on the now well-known phenomenon that a signal containing no frequencies greater than $W_0$ cycles per second (c.p.s.) and having a duration T will be described completely by a set of $2W_0T$ pieces of data obtained by sampling the instantaneous amplitude of the signal at a regular rate of $2W_0$ samples per second. These $2W_0T$ pieces of data, or signal samples, transmitted in a regular series to a receiver over an appropriate communication channel, leave the channel free for the transmission in a like manner of other signal samples during the intervals between samples. Thus a plurality of signals can be transmitted over one path by "interleaving" those samples which will describe completely each respective signal.

In accordance with this concept, a multistation line is connected through a transformer, filter, and line gate or sampling switch to the common bus of the time division switching network. This time division switching network interconnects lines by closing their respective sampling switches in the same time slot in a repetitive cycle of time slots, such that a continuous waveform, a sample of which is provided in each time slot, is reconstructed by smoothing the samples in the respective line filters. Control signals governing line operation, such as closing the sampling switch, or applying ringing tone to the line, are provided by a control signal source in a switch unit serving several multistation lines.

Because the requirement for transmitting high power ringing signals and low power time division communication signals are antithetical, various circuits have been developed to apply ringing current selectively to one of a plurality of telephones sharing the multistation line. Those signaling devices characterizing the prior art have used individual circuits for each station. An individual circuit is activated by a specific control signal to apply ringing tone to a selected station sharing a multistation line.

In accordance with the specific embodiment under consideration, ringing tone is applied to one of the stations sharing a multistation line by selectively activating control elements individual to the station. The individual elements, however, are activated in response to the coincident receipt of two control signals, one transmitted from a signal source to the sampling switch of the line shared by the called station, the other sent from the signal source through a signaling bus individual to one station on each line and including the called station.

More particularly, control signals transmitted to the sampling switch are applied to an array of coincidence gates, each of which is unique to a station sharing the line. A group of signaling buses common to the multistation lines are each coupled to a corresponding coincidence gate in each line. Consequently, the simultaneous arrival of a control signal to the sampling switch at all of the coincidence gates on the line and a control signal from the signaling bus at the one gate in the entire array unique to the called station, enables that gate to activate a hold circuit which connects the corresponding station to the source of ringing tone.

Further, in accordance with an aspect of my invention, the control signal source is transformer coupled to the sampling switch, and the control signal derived from the sampling switch is obtained not by a transmission through the switch but instead by transformer coupling. Accordingly, my invention utilizes the control arrangements already present in the time division system for operation of the sampling gates to obtain one of the coincident control signals for selection of the particular party on the multiparty line and utilizes these priorly existing arrangements without causing transmission of any additional signals through the sampling gates themselves.

Thus, in accordance with this embodiment, there is provided a novel and inexpensive circuit arrangement in a time division switching system which selectively connects individual stations sharing a multistation line to a source of ringing tone without transmitting the ringing tone through the time division system. The stations are connected, moreover, in a manner that obviates the need for extensive special equipment at each station, or costly and sensitive circuits in the switch unit and reduces the number of control signals required to apply ringing tone to a specific station.

It is a feature of this invention that a multistation line is associated with a signaling bus and with a means for sending control signals to the line to execute logical functions at individually selected stations coupled to the line.

It is another feature of this invention that stations sharing a multistation line are selectively connected to a source of ringing tone by the coincident arrival at the line of control signals applied to the sampling switch and a signaling bus individual to the stations but common to several of the lines.

It is a further feature of my invention that control signals normally applied to the sampling gate are utilized as one of the coincident signals for applying ringing to one party on a multiparty line. More specifically, in accordance with this feature of my invention, the sampling gate control signal itself, rather than any signal through the thus enabled gate, is utilized and, in one specific embodiment in accordance with this feature, the sampling gate signal is transformer coupled to the sampling gate and the desired control signal for the ringing selection operation is in turn transformer coupled from the sampling gate control circuit.

A more complete understanding of this embodiment and of these and other features thereof may be gained from consideration of the following detailed description and the accompanying drawing which is a diagrammatic representation of a multistation line system according to one specific embodiment of the present invention.

It will be noted that the figure employs a type of notation referred to as "detached contact" in which an *x* represents a normally open contact of a relay, and a bar, shown intersecting a conductor at right angles, represents a normally closed contact of a relay; "normally" referring to the unoperated condition of the relay. The principles of this type of notation are described in an article entitled, "An Improved Detached-Contact-Type Schematic Circuit Drawing," by F. T. Meyer in the September 1955 publication of the American Institute of Electrical Engineers Transactions, Communications and Electronics, volume 74, pages 505–513.

Turning now to the drawing, the figure shows some of the basic elements of a time division switching system, which will be described in general terms to provide a basis for the detailed description of the improvements realized in accordance with the embodiment of the multistation line circuit described herein.

The entire time division switching system is controlled by information placed in a memory store within control signal source 100. If a line is active on a call connection, desires service, or is a called line, the first output of control signal source 100 is directed over lead 102 to coupling coil 124 and then to ground to effect operation of switch

42, as for example, the switch described in more complete detail in W. B. Gaunt, Jr. patent application Ser. No. 319,265, filed Oct. 28, 1963, now Patent No. 3,235,753, issued Feb. 15, 1966. Switch 42 is operated, or closed, during a predetermined time period, or time slot, in a repeated cycle of time slots established within the system as hereinbefore mentioned. Each of the lines 73, 74, and 75, moreover, is connected to common bus 81 through sampling switches, transformers, and filters of which only those associated with line 73 are shown.

When sampling switch 42 is disabled, current flow between bus 81 and line 73 is inhibited. An appropriate signal, however, activates transistors $T_1$ and $T_2$ to regularly close sampling switch 42 at a rate, for example, of once every 87 microseconds. The closed switch connects line 73 to bus 81 such that current will flow in either direction between bus and line with a negligible voltage drop, thereby establishing a talking path on a time division basis.

Clearly, sampling switch 42, designed to transmit speech signals, is not suitable for the transmission of a 105 volt AC ringing signal. Consequently, and in accordance with the invention, a method and apparatus are provided whereby ringing tone is applied to individual stations sharing a multistation line without being transmitted through sampling switch 42, although utilizing the sampling switch control signals.

Accordingly, a second purpose accomplished by switch 42, in accordance with an aspect of my invention, is the coupling transmission of the switch control signals from source 100 over lead 102 to primary winding of transformer 124, through secondary winding of transformer 124, primary and secondary windings of transformer 104, and lead 106 to hold circuits 108 and 110. The switch control signal transmitted over this path can provide a pulse of, for example, 10 milliampers and .8 microsecond duration, for activation of hold circuit 108 or 110 as shall be described subsequently.

A multistation line, such as that exemplified by line 73, and described in more complete detail in R. K. York patent application Ser. No. 285,371, filed on June 4, 1963, now Patent No. 3,286,036, issued Nov. 15, 1966, has a relay 30 provided with an upper winding energized by a source of negative potential 25 and a lower winding energized by a source of positive potential 31. Circuit continuity for station 11 sharing multistation line 73 is completed from the potential source 31 through lower winding of relay 30, normally closed contacts 10–3, primary transformer winding 27–2, ring lead R and break contacts 20–1 to capacitor 128 connected in series with ring lead ringer 11 to ground. The station represented by ringer 11 is also provided with normally open switchhook contacts 7–4 and 7–5 and switchhook impedance 8A in series therewith, such that a party responding to ringing tone at ringer 11 and going off hook closes contacts 7–4 and 7–5 in ring lead R to permit current to flow through switchhook impedance 8A and thereby decrease the potential of the ringing signal as subsequently described. The make switchhook contacts 7–4 and 7–5 connect ring lead R to tip lead T, to complete the talking path for station 11 through break contacts 10–1, primary transformer winding 27–1, break contacts 20–3, and upper winding of relay 30 to negative potential source 25.

Tip lead T accommodates station 6, the ringer of which provides a path to ground through condenser 5. Make switchhook contacts 7–1 and 7–2 and switchhook impedance 8 associated with station 6 connect the tip lead with the ring lead to complete the talking path for station 6 through the same circuit as that which has been described previously in connection with station 11. Make contacts 7–3 and resistance 9 provide a path from tip lead to ground such that the party responding to the application of ringing tone to ringer 6 and going off hook closes switchhook contacts 7–3 and causes the ringing signal on tip lead T to be grounded.

A connection is made between tip lead T and upper winding of coil 30 through resistance 28A and make contacts 20–5 which parallels primary transformer coil winding 27–1. Resistance 28 similarly is connected in parallel with primary coil 27–2 between ring lead R and lower winding of coil 30 through make contacts 10–5. These resistances provide a resistive loading for the primary windings to ensure that longitudinal voltages will not be transmitted back through the switching network to indicate falsely an answered call, as subsequently described.

To apply ringing current to station 6, according to the invention, control signal source 100 transmits a first control signal to enable switch 42 during the time slot assigned to line 73 as previously described. The control signal is picked off coil 104 and is transmitted over lead 106 to a hold circuit 108 and to a substantially identical hold circuit 110, the only distinction between these circuits being the connection between lead 120 and relay 20 in hold circuit 110, as shown.

In a similar manner, control signal source 100, concurrent with the transmission of the switch control signal over lead 102, transmits a second control signal over signaling bus 112 which is common to all multistation lines served by the system, such as lines 73, 74, and 75. Signaling bus 112, however, is connected only to one hold circuit on each line, such as hold circuit 108 associated with line 73.

The coincidence of control signals from switch 42 and signaling bus 112 at AND gate 114, in hold circuit 108, enables gate 114 and permits PNPN transistor 116 to turn on and to continue to conduct current, irrespective of any subsequent fluctuations in the base voltage provided by AND gate 114, until the negative supply voltage 116B is interrupted. Operation of transistor 116 causes PNP transistor 118 to turn on and continue to conduct current until transistor 116 stops conducting.

Current flowing through transistor 118 operates relay 10. Operated relay 10 opens break contacts 10–1 in tip lead T of line 73 and closes make contacts 10–2 on lead 120 to connect the tip conductor T to tone source 21. The presence of tone signals on leads T and 120 thus energizes ringer 6 over the path from tone source 21, break contacts 30–1, conductor 120, make contacts 10–2, conductor T, capacitor 5, and ringer 6 to ground. Break contacts 10–3, moreover, are opened to keep line relay 30 from operating and opening break contacts 30–1 which would disconnect tone source 21 from lead 120.

In a similar manner, relay 20 is operated by transmitting a third control signal from source 100 over signaling bus 112 which is connected to hold circuit 110 on line 73 and individual to similar hold circuits on lines 74, and 75, simultaneously with the previously mentioned transmission of the first control signal to sampling switch 42. Energized relay 20 opens break contacts 20–1 and closes make contacts 20–2, to apply ringing current from tone source 21 to ringer 11 on the ring lead R over a path from tone source 21, closed contacts 30–1, conductor 120, closed contacts 20–2, conductor R, capacitor 128, and ringer 11 to ground. Break contacts 20–3 are opened to prevent the upper winding of line relay 30 from becoming energized and opening break contacts 30–1 to disconnect tone source 21 from lead 120 as hereinbefore mentioned.

Relay 10 (and in a corresponding manner, relay 20) is released by interrupting the negative voltage supply 116B to transistor 116 in some appropriate manner, as shown by the symbolic switch 126, which stops transistor 116 from conducting and thereby turns off transistor 118 which deenergizes the relay coil.

For example, a signal from control signal source 100 via bus 112 could be passed through an inverter and applied to the lead connecting the emitter junction of PNPN transistor 116 to the potential source 116A, to provide a pulse of opposite polarity. Such a pulse would interrupt the flow of current through transistor 116 and thereby turn the transistor 116 off until gate 114 is once again enabled.

Operation of relay 10 also closes contacts 10–4, so that the tip party, going off hook in response to the ringing signal, will close make switchhook contacts 7–1 and 7–2 and extend the ringing current to the ring conductor through a circuit from the tip conductor, through switchhook contacts 7–1, switchhook impedance 8, switchhook contacts 7–2, ring conductor, break contacts 20–1, primary transformer winding 27–2 and operated make contacts 10–4 to ground. Ring station 11 is not activated by the ringing signal traversing the circuit through station 6 and ring conductor R, because the voltage across ringer 11 has been reduced by switchhook impedance 8 to a value considerably lower in magnitude than the voltage of tone source 21.

Ringing current, now flowing through transformer primary winding 27–2 induces a ringing signal in secondary winding 27–3. The induced signal is limited in magnitude by clamping Zener diodes 12 and 13. This ringing signal is transmitted through filter 41 and switch 42 to common bus 81 each time sampling switch 42 is closed. These ringing signal samples, moreover, are transmitted from bus 81, over conductor 83 to detector 66 thereby providing an indication to the detector that the call has been answered.

Upon detection of ringing signals on control bus 81, the signals from control signal source 100 are no longer applied to signaling bus 112, thereby disabling gate 114. Switch 126, or the equivalent thereof, is also opened, turning off the current supply to transistor 116 which extinguishes transistors 116 and 118 thereby causing relay 10 to release. Switch 126 operation can be accomplished on a cyclical basis as a part of the entire system operation, such that the switch is opened and closed entirely independently of the status of AND gate 114. When relay 10 releases, break contacts 10–3 close and make contacts 10–4 open.

A continuous circuit is thereby provided to operate relay 30 from positive potential source 31, lower winding of relay 30, break contacts 10–3, winding 27–2, ring lead R, break contacts 20–1, make contacts 7–2, impedance 8, make contacts 7–1, tip lead T, break contacts 10–1, winding 27–1, break contacts 20–3 and upper winding of relay 30 to negative potential 25.

In a manner similar to that described for the circuits previously considered in connection with relay 10, ringer 11 on the ring conductor is activated by the coincident application to hold circuit 110 of control signals from sampling switch 42 and signaling bus 122. These signals operate hold circuit 110 to energize relay 20 in a manner similar to that which was described in connection with hold circuit 108. Operated relay 20 closes contacts 20–2 and opens contacts 20–1 to apply ringing tone to ringer 11 from tone source 21 over an obvious path.

To indicate to detector 66 that the called ring station has gone off hook, the ringing signal on the ring conductor R is applied to detector 66 through lead 83 by way of common bus 81, sampling switch 42, filter 41, transformer secondary winding 27–3, transformer primary winding 27–1, tip conductor T, break contacts 10–1, switchhook contacts 7–4 and 7–5, switchhook impedance 8A, and ring conductor R. The ringing signal voltage drop, moreover, across switchhook resistance 8A is such that ringer 6 on tip lead T is not energized.

Operated relay 20 also closes contacts 20–4 and 20–5 to provide a ground for ring station 11 and to place resistance 28A in parallel with primary transformer winding 27–1, respectively.

On originating calls, if either station sharing line 73 goes off hook, relay 30 is operated, closing contacts 30–4 in conductor 103 to apply a potential from source 51 over an obvious circuit to scan bus 91 and conductor 92.

Scanner 64 detects the change in potential on conductor 92 and initiates a sequence of steps to determine calling station identity by operating relay 10 through hold circuit 108 in the manner hereinbefore described in connection with a terminating call. Operated relay 30 closes make contacts 30–3 and operated relay 10 closes make contacts 10–7 to provide a path for current to flow from source 31 through the lower winding of relay 30, contacts 30–3, 10–7, and resistor 29 to ground to keep relay 30 operated. Contacts 30–1, moreover, are opened to prevent ringing current from being applied through the now closed make contacts 10–2 to the tip lead.

If the tip party originated the call, switchhook contacts 7–3 are closed to permit current to flow from ground through resistor 9, make contacts 7–3, 10–2, and 30–2, and the winding of relay 20 to negative potential source 76, thereby energizing relay 20.

Because relays 20 and 30 are both operated when the tip party originates a call, the potential of source 51 on conductor 103 is extended through closed contacts 30–4 and 20–6, resistors 53 and 55, diode 57, scan bus 91, and conductor 92 to scanner 64, to notify scanner 64 that the tip party originated the request.

If the ring party originated the call, switchhook contacts 7–3 remain open and relay 20 is not operated. Because relay 20 is not operated and relay 10 is operated, break contacts 10–6 and make contacts 20–6 are open, preventing the potential from source 51 from being extended to scanner 64. The absence of potential on lead 102 informs scanner 64 that ring party 11 originated the call.

After the calling party identity has been determined, relay 10 is released in the manner described in connecttion with a terminating call. When relay 10 releases, contacts 10–3 close and contacts 10–7 open to place relay 30 on line current. Relay 20, if previously operated, now releases, because contacts 10–2 are now open breaking the continuity of the circuit from ground through relay 20 to potential source 76.

Thus there is provided method and apparatus for selectively applying ringing tone to any one of the stations sharing a multistation line. This embodiment uses circuitry which is available in conventional line circuits and requires only a small quantity of relatively inexpensive and rugged additional equipment. It is to be understood that the above-described arrangements are merely illustrative of the application of the principles of the invention. Numerous other arrangements may be devised by those skilled in the art without departing from the spirit and scope of the invention.

For example, by providing positively and negatively biased tone sources, two more ringers could be accommodated on each line. The principles of this invention, moreover, are not limited to the application of ringing tone to individual stations, but can be arranged to provide key telephone services, tip and ring line maintenance or the execution of other logical functions at the individual stations by expanding the logic. This expansion of circuit logic can be facilitated by coupling more than one bus to each hold circuit to provide specific signaling combinations, or by providing additional hold circuit logic for each line.

What is claimed is:

1. In a communication system having a plurality of multistation lines, means for signaling a selected station on one of said multistation lines comprising a signal source, a plurality of signaling buses each common to a distinct station in each of said multistation lines, means for applying a first control signal to said multistation line terminating said selected station, means for applying a second control signal to said signaling bus associated with said selected station, and means responsive to the concurrent receipt of said first and second signals for connecting said signal source to said selected station.

2. In a communication system, the combination in accordance with claim 1 and further comprising a single control signal source for generating said first and second control signals.

3. In a communication system, the combination in accordance with claim 1 and further comprising a time division switching network having a common transmission bus, a sampling switch terminating each of said multistation lines for connecting the corresponding line to said common transmission bus in a selected time slot of a repetitive cycle of time slots, and means comprising said first control signal applying means for enabling the sampling switch in the line terminating said selected station.

4. In a communication system, the combination in accordance with claim 3 wherein said sampling switch comprises a coincidence gate having one input from said sampling switch enabling means and another input from said signaling bus associated with said selected station.

5. The method for signaling a selected station on one of a plurality of multistation lines terminating in a time division switching network comprising the steps of applying a first control signal to the line containing the selected station, applying a second control signal to a signaling bus individual to one station on each of said lines and including said selected station, and connecting a signal source to said selected station upon concurrent receipt of the first and second control signals in a coincidence circuit associated with the selected station.

6. In a communication system having a plurality of multistation lines, the combination comprising means for applying a first control signal to one of said plurality of multistation lines, a signaling bus connected to said signal applying means and individual to a station on said one multistation line for transmitting a second control signal, a source of ringing tone, and means individual to said station responsive to receipt of said first and second control signals for connecting said ringing tone source to said station.

7. In a communication system, the combination according to claim 6 comprising a plurality of signaling buses common to said plurality of multistation lines and individual to a corresponding one of a plurality of stations on each of said multistation lines.

8. In a communication system having a plurality of multistation lines, the combination for providing ringing tone to a selected sation on one of said multistation lines comprising gating means individual to said selected station, switch means terminating said one multistation line, means for enabling said switch means to transfer information to and from said one line, a signaling bus, means for applying one control signal through said switch enabling means to said gating means and for applying another control signal through said signaling bus to said gating means, coincident receipt of said control signals enabling said gating means to apply ringing tone to said selected station.

9. In a communication system, the combination according to claim 8 wherein said gating means comprises second switch means individual to said station for applying said ringing tone to said station.

10. In a communication system, the combination according to claim 9 wherein said gating means comprises an AND gate and a pair of transistors for activating said second switch means.

11. In a time division communication system, a plurality of multistation lines, a common bus, sampling switch means connecting each of said lines to said bus, means for selectively applying enabling control signals to said sampling switch means to establish a connection from individual of said lines to said bus through first paths through said sampling switch means, a ringing source, a plurality of coincident gate means for enabling said ringing source, and means for applying coincident control signals to a selected one of said coincident gate means, said last-mentioned means including a plurality of signaling buses and means connected to said sampling switch means and responsive to said control signals selectively applied to said sampling switch means through second paths through said sampling switch means.

12. In a time division communication system, the combination in accordance with claim 11 wherein said means for selectively applying enabling control signals to said sampling switch means includes first transformer coupling means and said means connected to said sampling switch means and responsive to said control signals selectively applied to said sampling switch means includes second transformer coupling means.

13. In a time division communication system having a plurality of multistation lines, a common bus, sampling switch means for selective connection of said lines to said common bus, and means for applying enabling signals to said sampling switch means; a ringing source and means for selectively connecting said ringing source to individual of the stations on said multistation lines, said last-mentioned means including a plurality of signaling buses, coincident gating means connecting to said buses, and means for applying said enabling signals applied to said sampling switch means also to said coincident gating means.

14. In a time division communication system having logic circuitry associated with each line, the combination comprising a common bus, sampling switch means for selective connection of said lines to said common bus, means for applying enabling signals to said sampling switch means and means for selectively activating said logic circuitry individual to each line, said last-mentioned means including a plurality of signaling buses, coincident gating means connected to said buses, and means for applying said enabling signals applied to said sampling switch means also to said coincident gating means.

15. The time division communication system combination according to claim 14 comprising a ringing signal source for selective connection to said lines, said logic circuitry comprising a plurality of hold circuits individual to said lines and relay means responsive to activation of one of said hold circuits for selectively connecting said ringing signal source to said lines.

No references cited.

KATHLEEN H. CLAFFY, *Primary Examiner.*

R. LINN, *Assistant Examiner.*